UNITED STATES PATENT OFFICE.

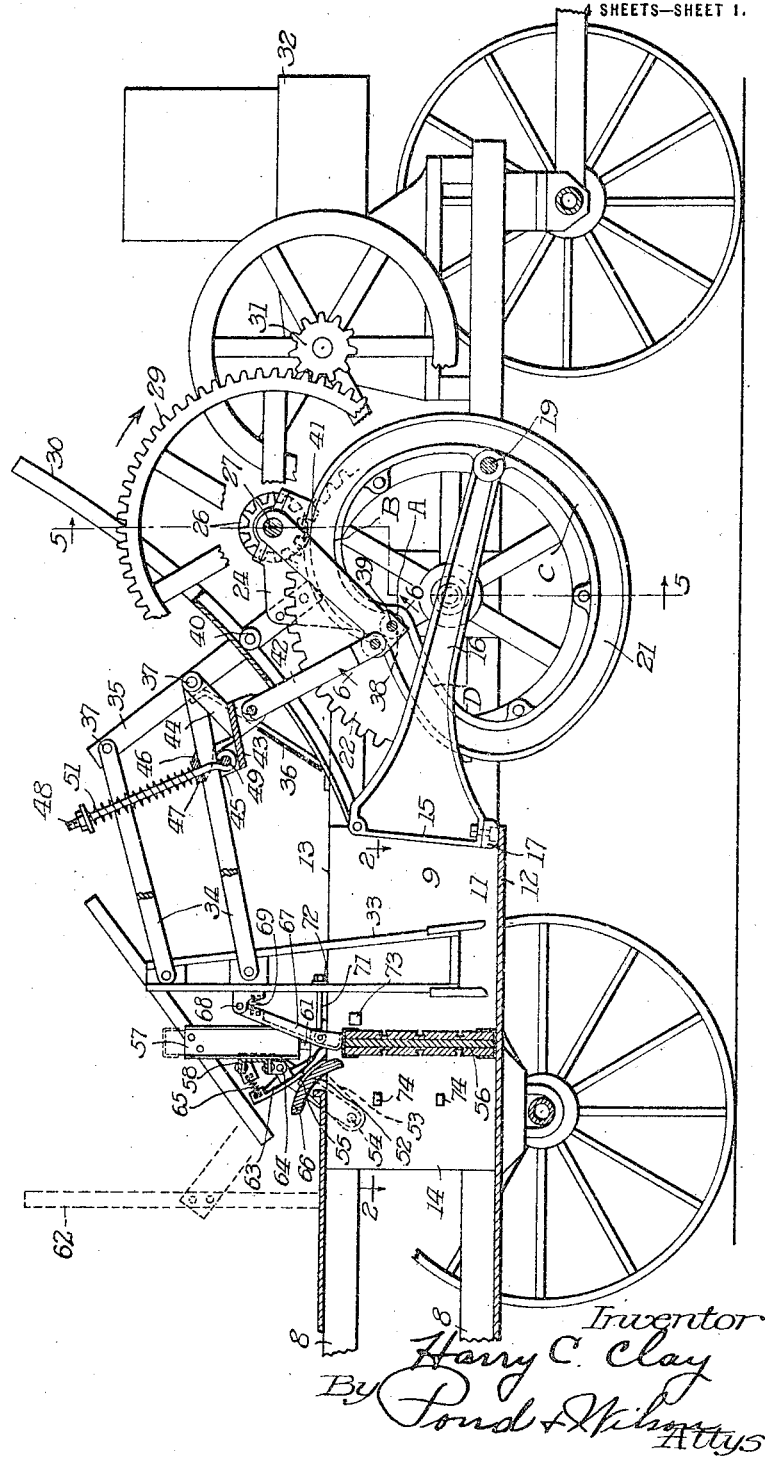

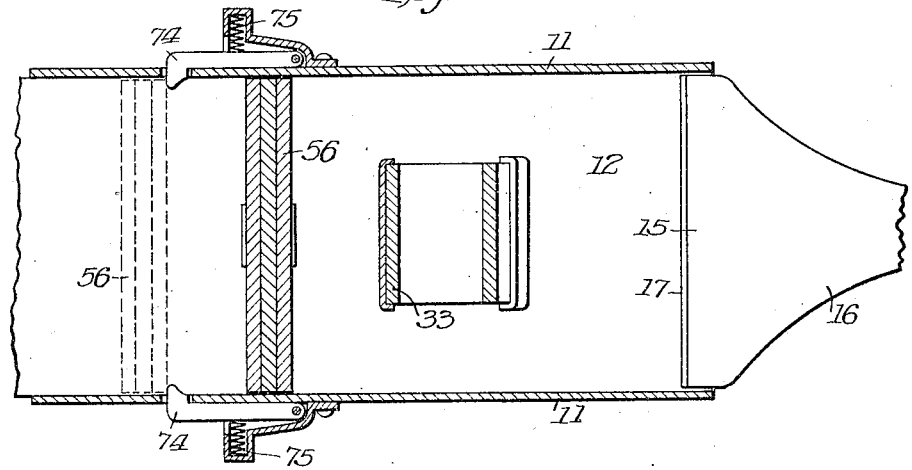
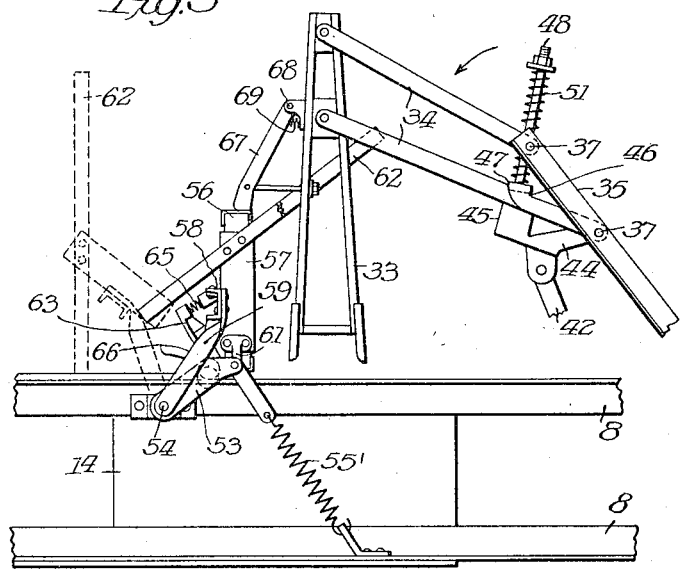

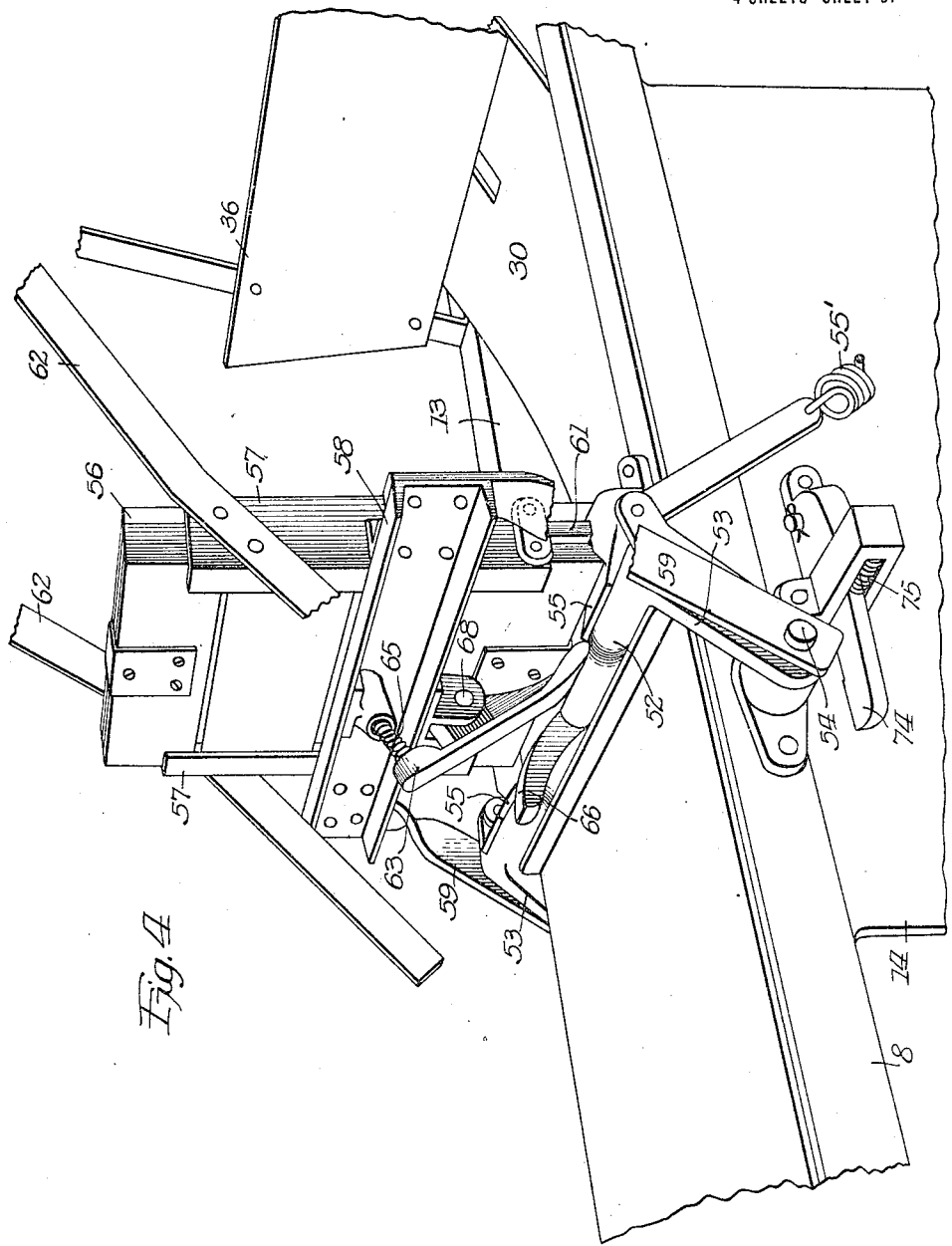

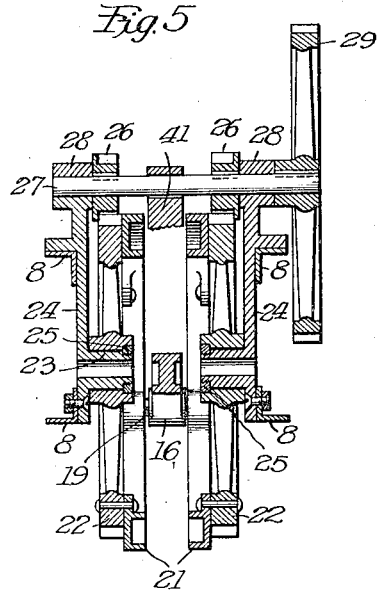
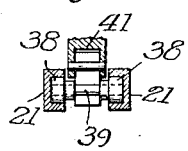
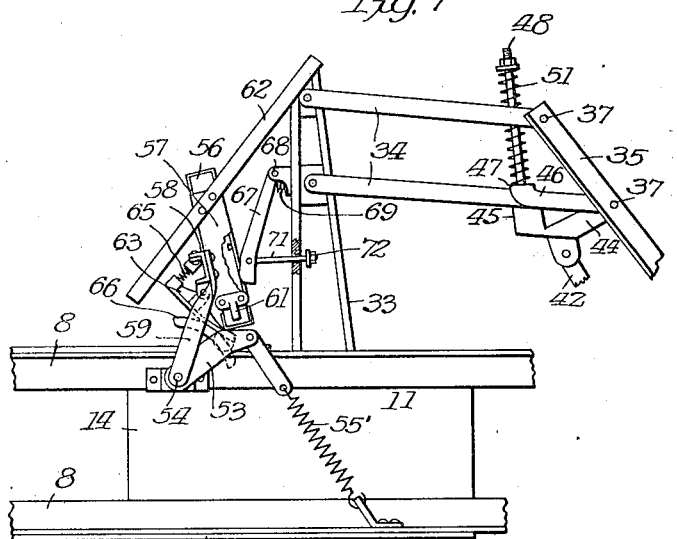

HARRY C. CLAY, OF COLUMBUS, INDIANA, ASSIGNOR TO EMERSON-BRANTINGHAM COMPANY, OF ROCKFORD, ILLINOIS, A CORPORATION OF ILLINOIS.

BALING-PRESS.

1,288,838.

Specification of Letters Patent.

Patented Dec. 24, 1918.

Application filed September 18, 1916. Serial No. 120,870.

*To all whom it may concern:*

Be it known that I, HARRY C. CLAY, a citizen of the United States, residing at Columbus, in the county of Bartholomew and State of Indiana, have invented certain new and useful Improvements in Baling-Presses, of which the following is a specification.

This invention relates to baling presses for baling hay, straw and the like and its primary object is to provide a baler of large baling capacity which will be comparatively light in construction but amply strong and durable for the heaviest service requirements and of such simple construction as to be capable of production at a low cost.

I have also aimed to provide a baler of relatively short length which will be capable of a long stroke, made possible by reason of the provision of a plunger and feeder head driving mechanism of novel construction. In regard to this mechanism, my invention contemplates the provision of a combined plunger and pitman operated by a crank or a pitman pin that revolves about an axis set below the horizontal center of the baling chamber, by reason of which greater efficiency is obtained because the compression stroke of the plunger has an advantage in leverage and the friction of the plunger is reduced to a minimum. I preferably connect the pitman directly to a pair of master gears, the bearings or trunnions of which are located below the horizontal center of the baling chamber and equip these gears with cams for operating the feeder head. By thus operating both the plunger and feeder head directly from a pair of heavy rotating master or drive gears, advantages in efficiency of operating and in simplicity and compactness of structure are gained.

In the accompanying drawings, wherein I have illustrated one practical embodiment of my improvements, Figure 1. is a longitudinal sectional view through a baling press embodying my invention, showing the feeder head at the end of its feeding stroke, certain parts being broken away for clarity.

Fig. 2. is a plan sectional view taken on the line 2—2 of Fig. 1;

Fig. 3. is a fragmentary view illustrating the feeder head in the position in its feed movement in which it engages the block;

Fig. 4 is a perspective view of the block guide in the position shown in Fig. 3;

Fig. 5. is a vertical sectional view taken on the line 5—5 of Fig. 1;

Fig. 6. is a detail sectional view taken on the line 6—6 of Fig. 1; and

Fig. 7 is a view illustrating the manner in which the block dropper passes a block when the same has not been fully moved to set position.

The frame, which may be suitably supported by carrying wheels, is formed in the present instance by longitudinal angle bars 8 suitably joined together in rigid relation to define the shape of the compressing and baling chambers. The compressing chamber 9 comprising the side walls 11 and the bottom 12, has a feeding opening 13 at its top through which hay is fed into the chamber. The baling chamber 14 may be closed at its top and bottom and have its sides left open, as shown, as is customary.

The plunger employed for compressing the hay, straw, alfalfa or other material to be baled in the chamber 9, consists of a head 15 made integral with a pitman 16. The plunger head, sufficiently heavy to rest at all times on the bottom plate 12, is equipped on its lower edge with a detachable wearing block or shoe 17 of chilled iron which may be renewed when it has been worn out. The driving mechanism operates the plunger in a novel manner so that the greatest power is obtained on the compression stroke and at the same time the friction between the plunger and bottom of the compressing chamber is reduced to a minimum. This driving mechanism in connection with the combined plunger and pitman also gives a very compact and simple construction having many advantages, as will be presently apparent. The end of the pitman is connected to a crank or wrist pin 19 interposed between and secured to a pair of opposed cams designated generally by reference character 21 which in turn are bolted rigidly to a pair of master gears 22. These gears as shown in Figs. 1 and 5 are journaled on trunnions 23 projecting inwardly from and formed integrally with side brackets 24 in turn fixedly secured to the frame bars 8. Set collars 25 hold the master gears against displacement from their bearings 23. It will be noted that the axis of the master gears is located a substantial distance below the horizontal center of the compressing chamber, consequently the angle of the pitman during the compression stroke is less than it would be if the axis of said gears was on a line with the center of said chamber. It follows, therefore, that the greatest leverage is utilized on the compression stroke and that, because of the diminished angle of the pitman at the time of the greatest pressure, the friction on the bottom of the compressing chamber is materially reduced.

Suitable means may be employed for driving the gears 22 and in the present instance I have shown spur pinions 26 in mesh with the master gears 22 and keyed onto a shaft 27 that is journaled in bearings 28 carried by the side brackets 24. Upon one end of the shaft 27 is secured a spur gear 29 with which meshes a pinion 31 in turn secured to a drive shaft. In this instance the drive shaft constitutes the drive shaft of a gas engine 32 mounted on the frame. By reason of the above described means for operating the plunger, consisting in comparatively heavy rotating parts compactly arranged so as to operate the feeder head in a very direct manner, as will be described presently, an engine of relatively low horse power may be employed for operating the press under heavy capacity service, thus affording economy in operation and permitting lightness in weight.

Coming now to the feeder head and means for operating the same it will be observed that the feeder head proper consists of a suitable rigid elongated structure 33 pivotally supported, by pairs of spaced upper and lower substantially parallel links 34, from upstanding bars 35 rigidly secured to the side brackets 24 and braced by bars 36. By reason of this construction the feeder head may swing upwardly from the position shown in Fig. 1 on the pivots 37 to a retracted position and may swing downwardly in a feed movement to force hay through the opening 13 and into the compressing chamber in front of the plunger. This oscillating movement is imparted to the feeder head by means of the cams 21 mentioned above through the intermediary of a direct connection between the cams and links 34. Said connection includes a safety spring allowing the feeder head to yield during its feed stroke sufficiently to prevent breakage by encountering any obstruction accidentally lodged in the feed opening when the baler is in motion or when an exceptionally large supply of hay is forced into said opening. Viewing Figs. 5 and 6 it will be noted that the channel shaped cams 21 are faced inwardly and as shown in Fig. 1, present continuous channel grooves or camways in which rollers 38 mounted on a pin 39 operate. This pin 39 is mounted on the end of an arm 41 pivoted on the shaft 27 so as to be held in proper relation to the cams and be capable of oscillation thereby. Link 42 pivotally connects the free end of the arm 41 to a bracket 43 which is provided with an upwardly inclined arm 44 pivotally mounted on the lowermost pivot bolt 37 and is provided also with a pair of upstanding spaced stops 45 against which the lowermost links 34 abut. Another bracket 46 is shaped to provide a pair of spaced arms located on the outer sides of the links 34 and pivoted to the lowermost pivot bolt 37 and also to provide a cross portion 47 joining the free ends of said arms and engaging the top of the lowermost links 34. These links 34 are confined between the stops 45 and cross bar 47 and an operating connection is established between the parts 43 and 47, by means of a bolt 48 passing through the portion 47 and pivoted at 49 to the part 43 and carrying a coiled expansion spring interposed between the part 47 and an adjustable nut on the end of the bolt. Referring to the cams 21 it will be noted viewing Fig. 1, that the same are shaped to provide a low point A, a rise B, rest or inactive portion C, and a fall D for producing the feed movement. From the foregoing it will be manifest that as the cams which are in effect integral with the master gears, are rotated in a counter-clockwise direction viewing Fig. 1, the link connection 42 will be moved upwardly by the rise B, thus swinging the links 34 and the feeder head 33 upwardly to a retracted position, in which they will be held stationary during substantially 180 degrees of the cam movement. During this portion of the cam movement the plunger is moved forwardly in its compression stroke and partially retracted. During the retracting movement of the plunger the feeder head will be forcibly drawn down by the cams 21, the movement being transmitted through the spring 51. Should the feeder head meet a resistance greater than the pressure of this spring, the head would yield to such resistance, swinging together with the bracket 46 on the pivot bolts 37 and independently of the bracket 43, so as to avoid breakage of parts. By utilizing cams in the manner described for operating the feeder head, it will be obvious that by varying the shape of the cams the feeder head may be advanced and retracted at any speed and at any interval desired and since the plunger is also operated directly from the same revolving part that operates the feeding head, the advantage in simplicity and in ability to easily time the feeder head in proper relation to the plunger, is exceedingly desirable. Another marked advantage of this arrangement, aside from the particular advantages gained by the offset relation of the master gears is derived from the momentum of these gears and from the fact that the operating pressure of the feeder head and plunger occurs alternately so that the driving effort is a substantially continuous one and is greatly increased by reason of the momentum of the parts.

An arcuate head 30 pivotally secured at one end to the top of the plunger and guided at its free end by rollers 40 mounted on the bars 35 will be moved back and forth across the feed opening 13 to prevent feeding of hay behind the plunger.

The tucker employed for forming an even top to the bale by tucking or pressing in the loose ends of hay after the plunger has been withdrawn is in the form of an arcuate body 52 extending transversely across one end of the feed opening 13 as shown clearly in Fig. 1 and having arms 53 formed at its end and pivotally mounted on studs 54 secured to the outer sides of the frame. Arcuate guards 55 bolted to the tops of the upper bars 8 overlie the adjacent portions of the tucker so as to prevent chaff, hay and foreign particles from getting between the frame and tucker so as to interfere with the operation of the same. A yielding force is employed to constantly urge the tucker downwardly, that is, in a clockwise direction viewing Fig. 1, to a position limited by abutment of the ends of the tucker against the tops of the upper frame bars 8. This force is secured by means of contractile springs 55′ connecting the free ends of the arms 53 to the frame as shown clearly in Fig. 3. When a quantity of hay is compressed, the tucker will be raised against the tension of the spring 55′ and when the plunger is withdrawn the tucker will automatically press the loose hay into the compressing chamber.

The dividing block guide and dropper of novel construction and operation will now be described. The block designated by reference character 56 may be of any suitable construction and is shown as being built up of a plurality of boards secured together by iron cleats so as to constitute a durable structure. The block holding and guiding means the construction of which is best shown in Fig. 4 consists of a pair of parallel channel guides 57 rigidly secured to a cross channel bar 58 to the ends of which are secured supporting arms 59 pivotally mounted on the studs 54 at the outer sides of the tucker arms 53. The block guide is shown in an operative or set position in Fig. 1 in which the guides 57 are vertically disposed above the feed opening 13, said guide being merely held by gravity in this position and limited in its movement by feet 61 which abut against the top of the guard brackets 55. The block guide may be swung on its pivot from this position by grasping one of the handles or bars 62 secured to the guides 57 and swinging them to an upright position as indicated in dotted lines in Fig. 1, which position is limited by abutment of the lower ends of the bars 62 against the top of the frame. The block may be inserted in the guide when it is in the said dotted line or block-receiving position and at the proper time, when a bale has been compressed, the guide will be swung to upright position from which the block may be ejected from the guide by the action of a dropper carried by the feeder head as will be presently described. Means provided for preventing displacement of the block from the guide until the block is ejected by the dropper consists of a latch or stop 63 pivoted intermediate its ends at 64 to the underside of the cross bar 58 and constantly urged in one direction by a spring 65 operating on one end of the latch to carry its opposite end into the path of a block inserted in the guide. This latch when in the position shown in Fig. 1 serves as a yielding detent to prevent the block from dropping but is adapted to yield when sufficient downward pressure is applied to the block thereby permitting the same to drop. It will be noted that when the block guide is in block-receiving position, the lower end of the latch 63 is engaged with the arcuate wing 66, thereby causing the latch to act as a positive stop for limiting the extent to which the block may be inserted into the guide. Thus it is impossible when setting a block to move it too far into the guide but when the guide is moved to operative or set position the positive stop automatically becomes a yielding detent. It will be noted that when the block guide is in receiving position the tucker may operate back and forth without disturbing the locking effect it has on the latch 63. The block will be ejected from the guide and dropped into the compressing chamber to form a division between two blades, by the action of a dropper carried by the feeder head. This dropper best shown in Fig. 1 is in the form of a pendant arm 67 pivotally connected at 68 to the feeder head and urged away from said head by an expansion spring 69 interposed between the head and arm, to a position limited by a bolt 71 pivotally connected to the free end of arm 67, passing loosely through an aperture in the cross head and provided with an adjustable head or stop 72 for limiting the outward movement of the arm. As shown in Fig. 3 when the feeder head descends and a block is properly supported in set position it will be engaged by the dropper 67 and forced downwardly into the compressing chamber, movement of the block toward the plunger being prevented by stops 73 projecting into the chamber from the side walls thereof. It sometimes happens that if an operator is not careful he may swing the block guide into set position when there is a quantity of stock over the feed mouth or covering the brackets 55 so that movement of the block guide to proper set position is prevented. Such a position of the block guide is shown in Fig. 7 and under this condition when the feeder head descends the dropper will simply strike the adjacent inclined side of the block and will yield while passing downwardly across the face of the block so as not to injure or damage either the dropper, the feeder head or the block holding and guiding means.

When the block has been dropped into the compressing chamber the next compressing stroke of the plunger will move the block into the baling chamber and past the inwardly projecting ends of spring-pressed stops 74 which prevent the block from being forced back into the compressing chamber by the expanding action of the bale. A pair of these stops 74 project through each side wall 11 and, as shown in Fig. 2, are pivotally mounted and yieldingly held in stopping position by means of expansion springs 75. In using the words "baling chamber" throughout the claims it should be understood that the same is used in a broad sense as designating the joint chambers spoken of in the description as the compressing chamber 9 and baling chamber 14.

It is believed that my invention and its mode and principle of operation should be clearly understood from the foregoing and it should be further understood that I do not limit myself to the details of construction shown and described since these may be variously changed and modified without departing from the spirit and scope of the invention or sacrificing any of its material advantages.

I claim:

1. In a baling press, the combination with a baling chamber, compressing plunger and feed head, of a rotatable driving element, an eccentric connection between the driving element and compressing plunger whereby the latter is directly reciprocated by rotative movement of said element, a revolving annular cam, and a connection operated from said cam by means of which the feed head is moved into and out of the baling chamber independently of the movement imparted to the compressing plunger, thereby enabling the operating movement of the feed head to be timed independently of the reciprocable movement imparted to the compressing plunger through said eccentric connection.

2. In a baling press, the combination with a baling chamber, compressing plunger and feed head, of a rotatable driving element, an eccentric connection between the driving element and compressing plunger whereby the latter is directly reciprocated by rotative movement of said element, an annular cam way rotatable with said driving element, and a connection between said cam-way and the feed head, the cam-way being shaped to operate the feed head in predetermined movements independent of the reciprocable movement imparted to the compressing plunger through means of said eccentric connection.

3. In a baling press, the combination with a baling chamber, compressing plunger and feed head, of mechanism for operating the compressing plunger and feed head alternately in compressing and feed strokes respectively, including a rotating driving element, an eccentric connection between said element and the compressing plunger, whereby reciprocating motion is imparted to the latter, and a single annular cam and connections therefrom to the feed head for operating the same and causing it to be held in a retracted idle position during substantially a half revolution of said eccentric connection.

4. In a baling press, the combination with a baling chamber, compressing plunger and feed head, of mechanism for alternately operating the compressing plunger and feed head in compressing and feed strokes respectively, including a rotating driving element, a connection therefrom to the compressing plunger whereby the latter is reciprocated by rotative movement of said element, and a revoluble annular cam operated from said element and connections from said annular cam to the feed head for moving the latter into the baling chamber from and to a retracted at-rest position during a relatively small portion of the cycle of rotation of said driving element.

5. In a baling press, the combination with a baling chamber, compressing plunger and feed head, of a driving shaft equipped with a pair of spaced drive pinions, a pair of gears meshing with said drive pinions, a compressing plunger pitman interposed between said gears and pivotally connected eccentrically thereto, an annular cam-way fixed to one of the gears, a cam follower disposed in said cam-way and adapted to be moved thereby in a radial direction, and a connection between the cam follower and feed head whereby the latter will be moved into and out of the baling chamber by the action of said cam-way.

6. In a baling press, the combination with a baling chamber, compressing plunger and feed head, of a driving shaft equipped with a pair of spaced drive pinions, a pair of gears meshing with said drive pinions, a compressing plunger pitman interposed between said gears and pivotally connected eccentrically thereto, an annular cam-way fixed to each gear, a cam follower interposed between and in engagement with the cam-way, said cams being similarly shaped to move the cam follower in a radial direction, means for confining the movement of the cam follower to a radial path, and a connection between the cam follower and feed head whereby the latter will be operated by the cam action.

7. In a baling press, the combination with a baling chamber, compressing plunger and feed head, of mechanism for alternately operating the compressing plunger and feed head in compressing and feed strokes respectively, comprising a driving shaft, means rotated thereby having an eccentric connection with the compressing plunger for reciprocating the same, an annular cam-way rotated by said driving shaft, and a connection between said cam-way and feed head, the shape of the cam-way being determinative of the movement of the feed head relative to the movement of the compressing plunger.

8. In a baling press, the combination with a baling chamber, compressing plunger and feed head, of mechanism for alternately operating the compressing plunger and feed head in compressing and feed strokes respectively, comprising a driving shaft, means rotated thereby having an eccentric connection with the compressing plunger for reciprocating the same, an annular cam-way rotated by said driving shaft, a cam follower for the cam-way, a connection between the cam follower and feed head, the cam-way being shaped to provide a rise and fall in a radial direction with respect to the pivot axis of the cam-way, whereby to move the feed head into and out of the baling chamber, and means for holding the cam follower in operative relation to the cam-way.

9. In a baling press, the combination with a baling chamber, compressing plunger and feed head, of driving mechanism for alternately operating the compressing plunger and feed head in compressing and feed strokes respectively, including a driving element connected with the compressing plunger and rotatable about a given axis for reciprocating the plunger, another driving element confined to a movement in a general radial direction with respect to said axis, an annular cam receiving its driving motion from the same source as said first mentioned driving element and shaped to operate the second mentioned driving element at interrupted intervals as distinguished from continuous motion of the first mentioned driving element, and means connecting the second mentioned driving element with the feed head whereby the latter is operated by the former.

10. In a baling press, the combination with a baling chamber, compressing plunger and feed head, of driving mechanism for alternately operating the compressing plunger and feed head in compressing and feed strokes respectively, comprising a continuously rotating eccentric connection for reciprocating the compressing plunger, a continuously rotating annular cam way constructed to impart a driving movement during only a portion of its cycle of rotation, and a connection between the annular cam way and the feed head whereby the latter will be operated in a driving movement and retracted during only a portion of the cycle, whereas the plunger will be moved during substantially the entire cycle of its respective driving member.

11. In a baling press, mechanism for operating the compressing plunger and feed head comprising a continuously rotating driving member connected with the compressing plunger for imparting reciprocating motion thereto, a continuously rotating cam shaped to provide a rise and a fall and a surface substantially concentric with the axis throughout substantially half of the cycle of rotation, an operating connection between said cam and said feed head for moving the latter in accordance with the shape of the cam whereby the feed head will be held in retracted idle position during substantially half of the cycle of rotation of the cam, the cam and the first mentioned drive member being relatively arranged so that said idle period of the feed head occurs during the compressing stroke of the plunger.

12. In a baling press, mechanism for alternately operating the compressing plunger and feed head in compressing and feed strokes respectively, including a continuously rotating annular cam and a cam follower operated by the cam and connected with the feed head for operating the same in intermittent feed strokes and maintaining the feed head in the intervals between the feed strokes in an idle position substantially at rest.

13. In a baling press, mechanism for alternately operating the compressing plunger and feed head in compressing and feed strokes respectively, including a continuously revolving annular cam and an operating connection between the annular cam and feed head for operating the latter at intervals interrupted by an idle period in which the feed head is held at rest.

14. In a baling press, mechanism for alternately operating the compressing plunger and feed head in compressing and feed strokes respectively, including a continuously revolving annular cam and a connection between the annular cam and feed head for moving the latter in intermittent feed strokes in alternate relation with respect to the compressing stroke, the feed head being maintained by the annular cam during said compressing strokes in substantially idle or at-rest position so as to allow an operator to effectually deliver the stock to the feed opening without interference by the feed head.

HARRY C. CLAY.

Copies of this patent may be obtained for five cents each, by addressing the "Commissioner of Patents, Washington, D. C."